(12) United States Patent
Taga

(10) Patent No.: US 10,686,318 B2
(45) Date of Patent: Jun. 16, 2020

(54) CHARGER FOR CHARGING BATTERY PACK OF ELECTRIC POWER TOOL

(71) Applicant: MAKITA CORPORATION, Anjo-shi, Aichi (JP)

(72) Inventor: Hideyuki Taga, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 87 days.

(21) Appl. No.: 15/967,919

(22) Filed: May 1, 2018

(65) Prior Publication Data

US 2018/0337540 A1 Nov. 22, 2018

(30) Foreign Application Priority Data

May 17, 2017 (JP) .................................. 2017-098116

(51) Int. Cl.
*H02J 7/00* (2006.01)
*H01M 10/44* (2006.01)
*B25F 5/02* (2006.01)

(52) U.S. Cl.
CPC .......... *H02J 7/0042* (2013.01); *H01M 10/44* (2013.01); *H02J 7/0013* (2013.01); *H02J 7/0044* (2013.01); *B25F 5/02* (2013.01); *H01M 2220/30* (2013.01)

(58) Field of Classification Search
CPC ...................................................... H02J 7/00
See application file for complete search history.

(56) References Cited

U.S. PATENT DOCUMENTS

| | | |
|---|---|---|
| 6,455,186 B1 | 9/2002 | Moores, Jr. et al. |
| 6,645,666 B1 | 11/2003 | Moores, Jr. et al. |
| 8,450,970 B1 | 5/2013 | Drinkwater |
| 2002/0034682 A1 | 3/2002 | Moores et al. |
| 2002/0197527 A1 | 12/2002 | Moores et al. |
| 2003/0027037 A1 | 2/2003 | Moores et al. |
| 2004/0174138 A1 | 9/2004 | Moores et al. |
| 2004/0175610 A1 | 9/2004 | Moores et al. |

(Continued)

FOREIGN PATENT DOCUMENTS

| | | |
|---|---|---|
| GB | 2471279 A | 12/2010 |
| JP | H11-288744 A | 10/1999 |

(Continued)

OTHER PUBLICATIONS

Sep. 25, 2018 European Search Report issued in European Patent Application No. 18170673.0.

(Continued)

*Primary Examiner* — Robert Grant
(74) *Attorney, Agent, or Firm* — Oliff PLC

(57) ABSTRACT

A charger is provided with a housing comprising an intake port and an exhaust port. A battery interface is disposed on the housing and is configured to removably receive the battery pack. A charging circuit is disposed within the housing and is configured to supply charging power to a battery pack attached to the battery interface. A blower is provided for introducing air into the housing through the intake port and exhausting air from the housing through the exhaust port. The housing is configured to be mountable on a wall extending in a vertical direction. The exhaust port is located higher in the vertical direction than the intake port when the housing is mounted on the wall.

18 Claims, 10 Drawing Sheets

(56) References Cited

U.S. PATENT DOCUMENTS

| | | |
|---|---|---|
| 2006/0110656 A1 | 5/2006 | Moores et al. |
| 2008/0102355 A1 | 5/2008 | Moores et al. |
| 2008/0213652 A1* | 9/2008 | Scheucher ............ B60L 53/305 |
| | | 429/62 |
| 2008/0290836 A1 | 11/2008 | Tsai et al. |
| 2009/0066288 A1* | 3/2009 | Altekruse ............. H02J 7/0042 |
| | | 320/107 |
| 2016/0294203 A1* | 10/2016 | Teng ..................... H02J 7/0042 |
| 2017/0331302 A1* | 11/2017 | Namiki ................. H01M 10/46 |

FOREIGN PATENT DOCUMENTS

| | | |
|---|---|---|
| JP | 2016-149841 A | 8/2016 |
| WO | 2016/067808 A1 | 5/2016 |

OTHER PUBLICATIONS

Aug. 26, 2019 European Office Action issued in European Patent Application No. 18170673.0.

\* cited by examiner

CHARGER FOR CHARGING BATTERY PACK OF ELECTRIC POWER TOOL

TECHNICAL FIELD

A technology disclosed in the present disclosure relates to a charger for charging a battery pack of an electric power tool.

BACKGROUND

Japanese Patent Application Publication No. 2016-149841 describes a charger for charging a battery pack of an electric power tool. This charger includes a housing which includes an intake port and an exhaust port, a battery interface which is provided on the housing, a charging circuit which supplies charging power to a battery pack attached to the battery interface and a blower which introduces air into the housing through the intake port and exhausts air to outside of the housing through the exhaust port. In this configuration, an interior of the housing is forcefully ventilated by the blower, and thus an increase in a temperature of the charging circuit is reduced.

SUMMARY

A conventional charger is designed as a desktop device and is normally installed on a desk or a rack. However, when the charger is installed on a desk or a rack, a limited space on the desk or the rack may be occupied by the charger. In this regard, when the charger is mountable on a wall, the charger is mounted on the wall, and thus the charger can be removed from the desk or the rack. However, depending on whether the charger is installed on the desk or the rack or the charger is mounted on the wall a posture of the charger is significantly changed (for example, by an angle of 90 degrees). When the posture of the charger is change a flow of air within a housing may be changed. Since the conventional charger is designed as a desktop device, it is likely that in the posture where the charger is mounted on the wall, an interior of the housing cannot be sufficiently ventilated.

Hence, the present disclosure provides a technology that allows sufficient ventilation in an interior of a housing in a charger which is mountable on a wall.

According to one aspect of the present technology, a charger configured to charge a battery pack of an electric power tool is disclosed. This charger may include a housing including an intake port and an exhaust port; a battery interface disposed on the housing and configured to removably receive the battery pack; a charging circuit disposed within the housing and configured to supply charging power to the battery pack attached to the battery interface; and a blower configured to introduce air into the housing through the intake port and exhaust air from the housing through the exhaust port. The housing may be configured to be mountable on a wall extending in a vertical direction, and the exhaust port may be located higher in the vertical direction than the intake port when the housing is mounted on the wall.

During the charging of the battery pack, the charging circuit within the housing generates heat. When the charging circuit generates heat, air around the charging circuit is warmed so as to be moved upward. In this way, within the housing, a flow of air moving upward is formed by heat convection. On the other hand, the intake port and the exhaust port are provided in the housing, and the exhaust port is located higher than the intake port. In this way, a flow of air moving upward is formed by the blower within the housing. The flow of air formed by the blower substantially coincides with the flow of air formed by the heat convection, and thus the air warmed by the charging circuit is smoothly exhausted to outside of the housing. In this way, an interior of the housing is sufficiently ventilated, and thus, for example, an increase in a temperature of the charging circuit is reduced.

DETAILED DESCRIPTION

Figure 1:
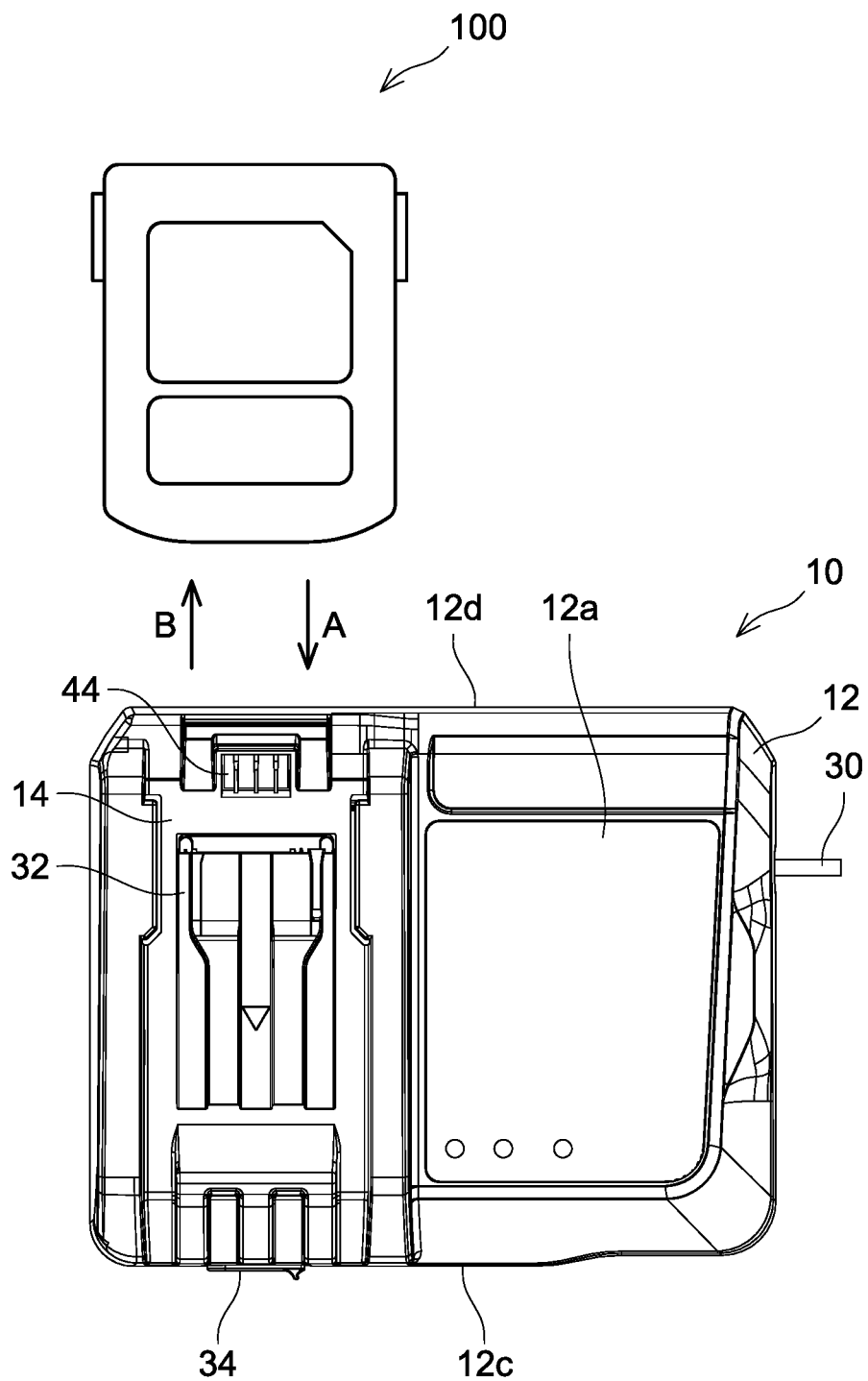
FIG. 1 is a plan view showing a charger 10 in an embodiment together with a battery pack 100.
Figure 2:
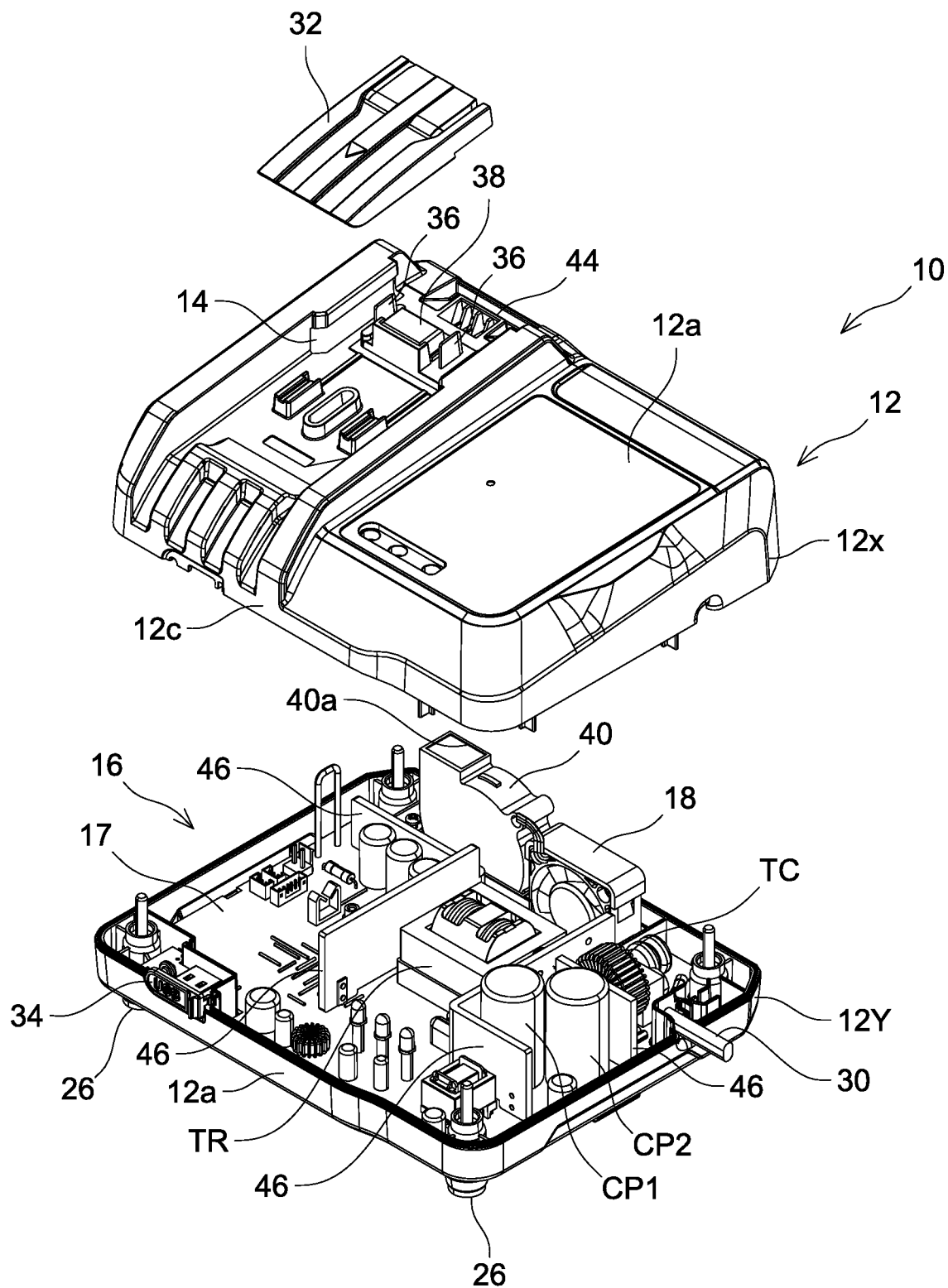
FIG. 2 is an exploded perspective view of the charger 10 in the embodiment.
Figure 3:
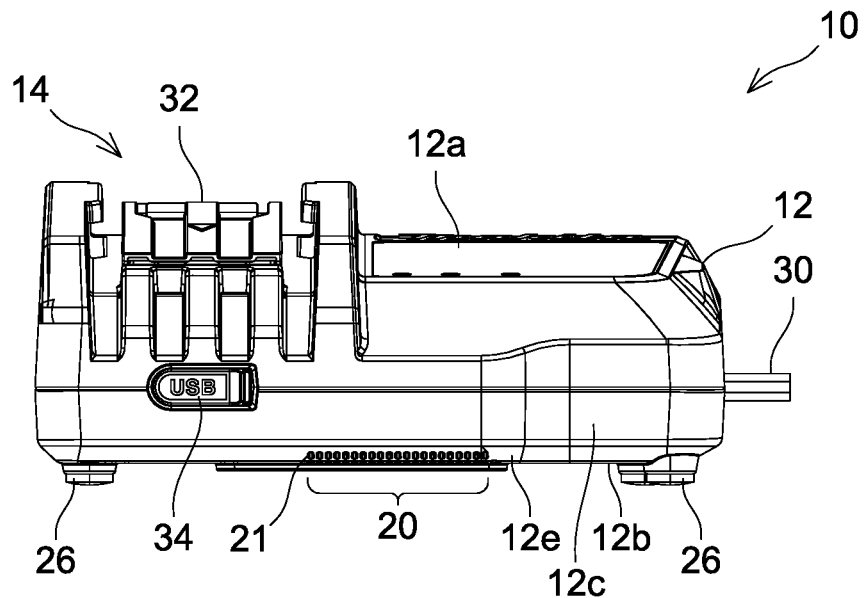
FIG. 3 is a front view of the charger 10 in the embodiment.
Figure 4:
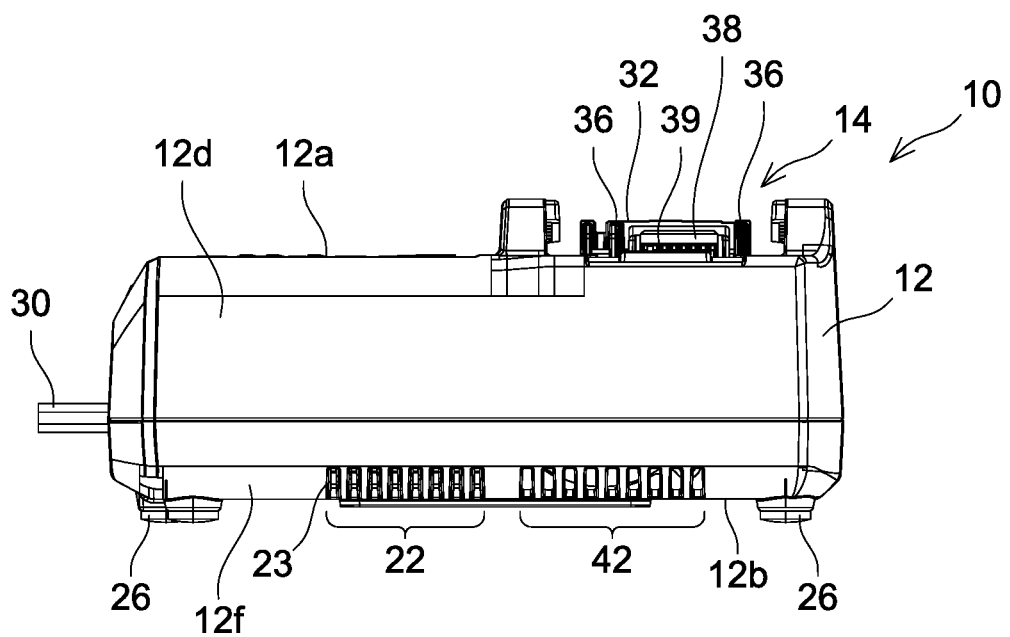
FIG. 4 is a back view of the charger 10 in the embodiment.

In some embodiments, the blower may be disposed closer to the exhaust port than to the intake port. In other words, a distance from the blower to the exhaust port may be shorter than a distance from the blower to the intake port. In this configuration, the flow of air within the housing is less likely to be disturbed, and thus it is possible to appropriately ventilate the interior of the housing. In an example, the blower may be disposed adjacent to the exhaust port.

In some embodiments, the housing may include an upper surface and a bottom surface located opposite to the upper surface. In this case, the bottom surface may be disposed along a wall, the intake port may be located along a lower edge of the bottom surface and the exhaust port may be located along an upper edge of the bottom surface, when the housing is mounted on the wall. In this configuration, the flow of air moving upward is formed in a substantially entire interior of the housing, and thus the interior of the housing is effectively ventilated. Since the intake port and the exhaust port are not completely covered with the wall, the flow of air in the intake port and the exhaust port is less likely to be inhibited by the wall.

In the embodiment described above, the bottom surface of the housing may include a curved portion along the lower edge, the curved portion being curved away from the wall. In this case, the intake port may be at least partly disposed within the curved portion along the lower edge. In this configuration, a space is formed between the intake port and the wall, and thus a flow path for air suctioned by the intake port is acquired. An amount of air suctioned in the intake port is increased, and thus the ventilation within the housing is more facilitated.

In addition to or instead of the configuration described above, the bottom surface of the housing may include a curved portion along the upper edge, the curved portion being curved away from the wall. In this case, the exhaust port may be at least partly disposed within the curved portion along the upper edge. In this configuration, a space is formed between the exhaust port and the wall; and thus a flow path for air exhausted from the exhaust port is acquired. An amount of air exhausted in the exhaust port is increased, and thus the ventilation within the housing is more facilitated.

In some embodiments, the blower may be disposed so as to blow air toward the exhaust port along a blowing direction. In this case, the blowing direction may be angled with the wall when the housing is mounted on the wall. Specifically, the blowing direction is not parallel to the wall but may be angled at less than 90 degrees with the wall. In particular, when the exhaust port is disposed along the upper edge of the bottom surface of the housing, the blower may be inclined toward the upper edge (that is, toward a corner portion of the housing).

In some embodiments, a battery interface may be disposed on the upper surface of the housing. In this configuration, even when the housing is mounted on the wall, a battery pack can be easily attached and detached with respect to the battery interface.

In some embodiments, the battery interface may be configured to receive the battery pack slidably in a sliding direction. In this case, the sliding direction may become parallel to the vertical direction when the housing is mounted on the wall. In this configuration, a longitudinal direction of the battery interface substantially coincides with a direction of the flow of the air within the housing, and thus the flow of the air within the housing can be prevented from being inhibited by the battery interface and components related thereto.

In some embodiments, the charger may include a filter disposed on the intake port. In this configuration, it is possible to prevent the intrusion of dust from the intake port. In this case, though there is no particular limitation, an opening for attaching and detaching the filter may be provided in the housing. In this configuration, it is possible to easily clean or replace the filter.

In some embodiments, the charging circuit may include a transformer. In this case, the blower may be located between the transformer and the exhaust port. The transformer is an electronic component which generates a large amount of heat. When blower is located between the transformer and the exhaust port, the heat generated by the transformer can be effectively exhausted from the exhaust port, and thereby an increase in a temperature of the charging circuit can b effectively reduced.

In the embodiment described above, the charger may further include a pair of heat sink plates opposed to each other via the transformer. In this case, each of the pair of heat sink plates may become parallel to the vertical direction when the housing is mounted on the wall. In this configuration, a flow path for air is formed between the pair of heat sink plates, and thus the transformer disposed within the flow path can be effectively cooled.

In the embodiment described above, the charging circuit may include a power semiconductor device disposed on the pair of the heat sink plates. In this configuration, the power semiconductor device is effectively cooled, and thus it is possible to avoid, for example, a heat failure in the power semiconductor device.

In some embodiments, the intake port and the exhaust port may each include a plurality of holes defined on the housing. In this configuration, sizes of the respective holes are decreased, and thus it is possible to reduce the intrusion of dust in the intake port and the exhaust port.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved chargers, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A charger 10 of an embodiment will be described with reference to drawings. As shown in FIG. 1, the charger 10 is an electrical device for charging a battery pack 100. The battery pack 100 is a power supply for an electric power tool (unillustrated) and is configured to be removably attached to the electric power tool. The charger 10 of the present embodiment is configured to charge the battery pack 100 in a state where the battery pack 100 is removed from the electric power tool. However, in another embodiment, the charger 10 may be configured to charge the battery pack 100 in a state where the battery pack 100 is attached to the electric power tool.

As shown in FIGS. 1 to 5, the charger 10 includes a housing 12, a battery interface 14, a charging circuit 16, and a blower 18. The battery interface 14 is provided in the housing 12, and removably receives the battery pack 100. The charging circuit 16 is provided within the housing 12, and supplies charging power to the battery pack 100 that is attached to the battery interface 14. The blower 18 ventilates an interior of the housing 12 so as to reduce an increase in a temperature of the charging circuit 16, in an example, the housing 12 in the present embodiment includes an upper portion 12X and a lower portion 12Y which are coupled to each other, and an internal space for storing the charging circuit 16 is formed between the upper portion 12X and the lower portion 12Y. The charging circuit 16 is connected through an electrical code 30 to an external AC power supply.

An intake port 20 and an exhaust port 22 are provided in the housing 12. The intake port 20 includes a plurality of intake holes 21 which are formed in the housing and makes an inside and an outside of the housing 12 communicate with each other. The exhaust port 22 includes a plurality of exhaust holes 23 which are formed in the housing 12, and makes the inside and the outside of the housing 12 communicate with each other. When the blower 18 is operated, air is introduced through the intake port 20 into the housing 12, and air is exhausted through the exhaust port 22 to the outside of the housing 12. In this way, the internal space of the housing 12 that houses the charging circuit 16 is ventilated.

In an example, the intake port 20 and the exhaust port 22 are provided in the lower portion 12Y of the housing 12, and are located along, peripheral edges 12e and 12f of a bottom surface 12b in the housing 12. The peripheral edge 12e of the bottom surface 12b along which the intake port 20 is located, is located in a boundary between the front surface 12c and the bottom surface 12b of the housing 12, and the peripheral edge 12f of the bottom surface 12b along which the exhaust port 22 is located, is located in a boundary between the back surface 12d and the bottom surface 12b of the housing 12. The bottom surface 12b includes, along the peripheral edges 12e and 12f, curved portions which are curved toward the front surface 12c. The intake port 20 and the exhaust port 22 are respectively located in the curved portions along the peripheral edges 12e and 12f.

The battery interface 14 is located on the upper surface 12a of the housing 12. The battery interface 14 slidably receives the battery pack 100 along directions A and B in FIG. 1. A pair of charging output terminal 36 and a communication connector 38 are provided in the battery interface 14. The communication connector 38 includes a plurality of communication terminals 39 (see FIG. 4). The pair of charging output terminals 36 and the communication terminals 39 are electrically connected to the battery pack 100 that is attached to the battery interface 14.

A movable cover 32 which covers the pair of charging output terminals 36 and the communication connector 38 is provided in the battery interface 14. Although in the present embodiment, the charger 10 supplies the charging power to the battery pack 100 by, a wired system, in another embodiment, the charger 10 may supply the charging power to the battery pack 100 by a wireless system. A USB port 34 for outputting DC, power is provided in the front surface 12c of the housing 12. The USB port 34 can be connected to an electronic device such as a smart phone, and supplies the charging power or operating power to the electronic device which is connected.

The charger 10 includes a second blower 40 for cooling the battery pack 100 which is being charged. A second intake port 42 and a second exhaust port 44 for the second blower 40 are provided in the housing 12. The second intake port 42 is located along the peripheral edge 12f of the bottom surface 12b in the housing 12, and the second exhaust port 44 is located in the battery interface 14. The second exhaust port 44 is coupled to the battery pack 100 that is attached to the battery interface 14. When the second blower 40 is operated, air introduced through the second intake port 42 is exhausted through the exhaust outlet 40a of the second blower 40. The exhaust outlet 40a of the second blower 40 is connected to the second exhaust port 44, and the air from the second blower 40 is supplied to the battery pack 100. In this way, the battery pack 100 which is being charged is cooled.

Figure 5:
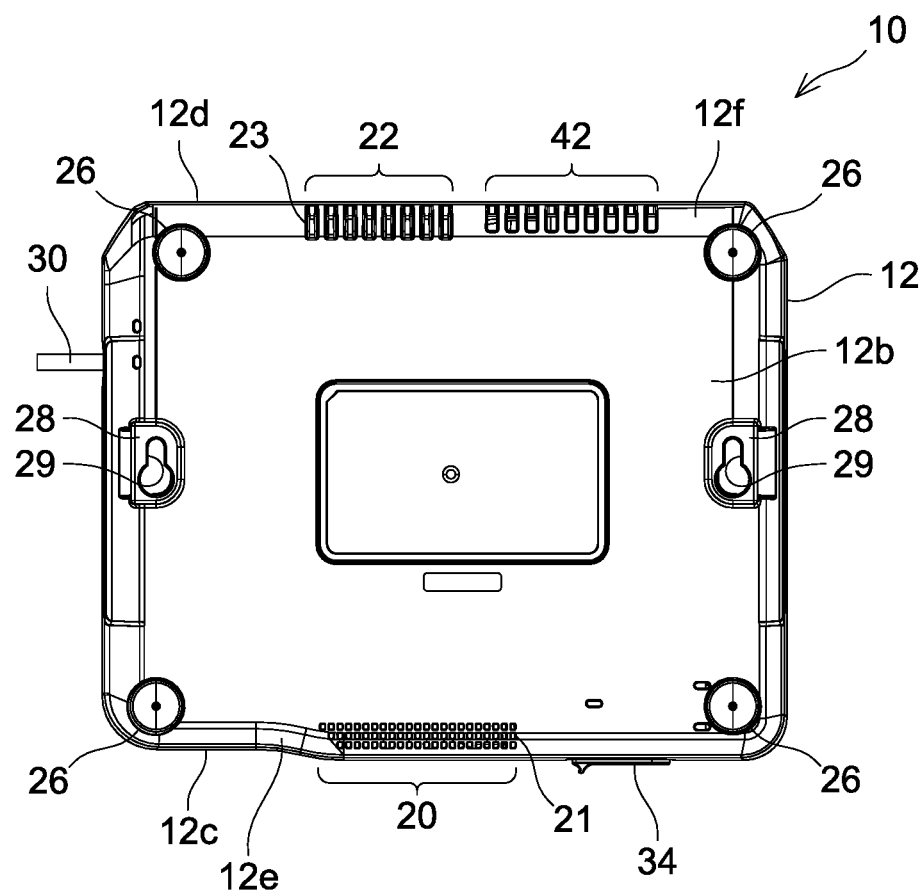
FIG. 5 is a bottom view of the charger 10 in the embodiment.
Figure 6:
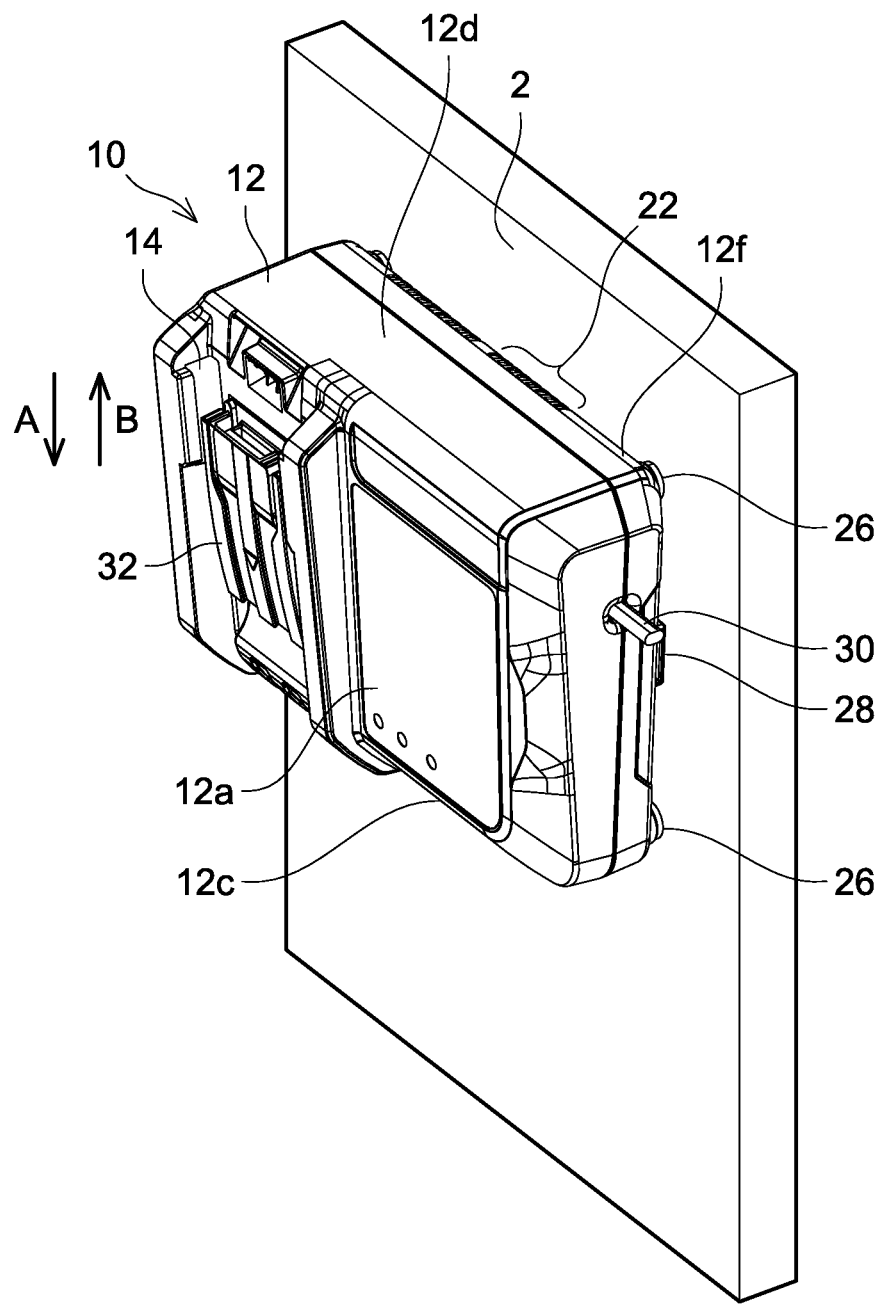
FIG. 6 shows the charger 10 mounted on a wall 2.

As shown in FIG. 5, the housing 12 includes a plurality of leg portions 26. The leg portions 26 are provided on the bottom surface 12b of the housing 12. When the charger 10 is placed on, for example, a desk or a rack, the leg portions 26 make contact with the surface of the desk or the rack so as to support the charger 10. The housing 12 further includes a plurality of wall mounting portions 28. The wall mounting portions 28 are provided on the bottom surface 12b of the housing 12. In this way, as shown in FIG. 6, the housing 12, can be mounted on a wall 2 extending in a vertical direction in a predetermined orientation. When the housing 12 is mounted on the wall 2, the bottom surface 12b of the housing 12 is disposed along the wall 2. The intake port 20 is located along the lower edge 12e of the bottom surface 12b, and the exhaust port 22 is located along the upper edge 12f of the bottom surface 12b. In other words, the exhaust port 22 is located higher than the intake port 20 in the vertical direction. The sliding directions A and B of the battery pack 100 in the battery interface 14 are parallel to the vertical direction. The term "parallel" herein is not limited to a completely parallel state and includes a state where an angle of less than 15 degrees is formed. In an example, the wall mounting portions 28 in the present embodiment include engagement holes 29 which engage with screws or hooks fixed to the wall 2. Positions, a number and a structure of the wall mounting portions 28 are not particularly limited. The wall mounting portions 28 may be configured such that the housing 12 can be mounted on the wall 2 extending in the vertical direction in the predetermined orientation.

The configuration of the charging circuit 16 will then be described with reference to FIGS. 7 and 8. The charging circuit 16 includes a circuit board 17 and a plurality of electronic components (for example, a transformer TR) provided on the circuit board 17. Although the configuration of the charging circuit 16 will be described in detail below, the configuration of the charging circuit 16 is not limited thereto. The configuration of the charging circuit 16 can be changed as necessary. As shown in FIG. 8, the charging circuit 16 includes a voltage doubler rectifier circuit 52, a switching circuit 54, the transformer TR, a secondary side rectifier circuit 56, a gate driver 58, a photocoupler 60 and a controller 62. The voltage doubler rectifier circuit 52 includes a diode bridge DB, a first capacitor CP1 and a second capacitor CP2, and can convert AC power into DC power. The AC power is supplied to the voltage doubler rectifier circuit 52 through the electrical code 30 from outside. The voltage doubler rectifier circuit 52 converts the supplied AC power into DC power so as to output it to the switching circuit 54. The voltage doubler rectifier circuit 52, a toroidal coil TC for removing a noise current in a common mode is provided between the electrical code 30 and the voltage doubler rectifier circuit 52.

The switching circuit 54 is provided between the voltage doubler rectifier circuit 52 and the transformer TR, and converts the DC power outputted from the voltage doubler rectifier circuit 52 into the AC power which is supplied to the transformer TR. In an example, the switching circuit 54 includes a first switching device SW1, a second switching device SW2, a third capacitor CP3 and a fourth capacitor CP4. The first switching device SW1 and the second switching device SW2 are controlled by the gate driver 58. Typically, the gate driver 58 alternately turns on the first switching device SW1 and the second switching device SW2 so as to input the AC power to the transformer TR. Here, the gate driver 58 changes duty ratios (turn-on time per period) for the first switching device SW1 and the second switching device SW2 and thereby can adjust the magnitude of the AC power to be supplied to the transformer TR. Although the first switching device SW1 and the second switching device SW2 are not particularly limited, they are power semiconductor devices such as a MOSFET (Metal-Oxide-Semiconductor Field-Effect Transistor).

The AC power supplied to the transformer TR, where the voltage of the AC power is stepped down, is supplied to the secondary side rectifier circuit 56. The secondary side rectifier circuit 56 includes a diode DI and a fifth capacitor CP5, and converts the AC power supplied from the transformer TR into DC power. The secondary side rectifier circuit 56 is connected to the pair of charging output terminals 36, and the DC power from the secondary side rectifier circuit 56 is supplied as the charging power to the battery pack 100. The charging power supplied to the battery pack 100 is monitored by the controller 62. For example, the controller 62 can detect a charging current supplied to the battery pack 100, and outputs a control signal corresponding to the detected charging current to the gate driver 58. The control signal is transmitted from the controller 62 through the photocoupler 60 to the gate driver 58. The gate driver 58 controls, according to the received control signal, the duty ratios for the first switching device SW1 and the second switching device SW2. In this way, the charging current supplied to the battery pack 100 is feedback controlled. The controller 62 is farther connected to the communication terminals 39.

As shown in FIG. 8, the battery pack 100 includes a plurality of secondary battery cells 104, a pair of battery power terminals 106, a battery controller 108, a temperature sensor 110 and a plurality of battery communication terminals 112. Although the secondary battery cells 104 are not particularly limited, they are lithium-ion cells. The secondary battery cells 104 are connected to the pair of battery power terminals 106. When the battery pack 100 is attached to the charger 10, the pair of battery power terminals 106 are connected to the pair of charging output terminals 36 in the charger 10. The battery controller 108 can detect voltages of the secondary battery cells 104. The temperature sensor 110 detects temperatures of the secondary battery cells 104. The battery controller 108 and the temperature sensor 110 are connected to the battery communication terminals 112. When the battery pack 100 is attached to the charger 10, the battery communication terminals 112 are individually connected to the communication terminals 39 in the charger 10. In this way, the controller 62 of the charger 10 can control an operation of charging the battery pack 100 according to the voltages and temperatures of the secondary battery cells 104 in the battery pack 100.

The charger 10 of the present embodiment is configured such that the housing 12 can be mounted on the wall 2 extending in the vertical direction. While the charger 10 is charging the battery pack 100, the charging circuit 16 within the housing 12 generates heat. When the charging circuit 16 generates heat, air around the charging circuit 16 is warmed so as to be moved upward. In this way, flow of air moving upward is formed by heat convection within the housing 12. On the other hand, in the housing 12, the intake port 20 and the exhaust port 22 are provided, and the exhaust port 22 is located higher than the intake port 20. In this way, within the housing 12, the flow of air moving upward is formed by the blower 18. The flow of air formed by the blower 18 substantially coincides with the flow of air by the heat convection, and thus the air warmed by the charging circuit 16 is smoothly exhausted to the outside of the housing 12. In this way, the interior of the housing 12 is sufficiently ventilated, and thus an increase in the temperature of the charging circuit 16 is reduced.

Figure 7:
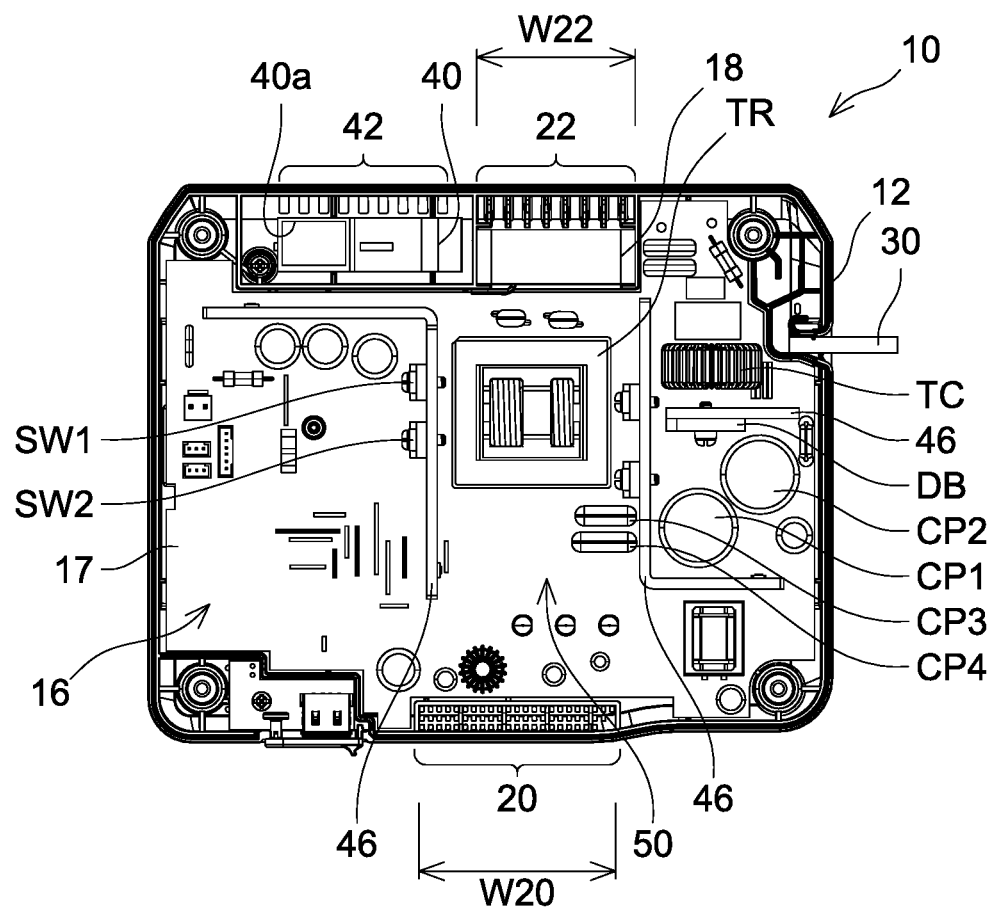
FIG. 7 is a plan view showing an internal structure of the charger 10.
Figure 8:
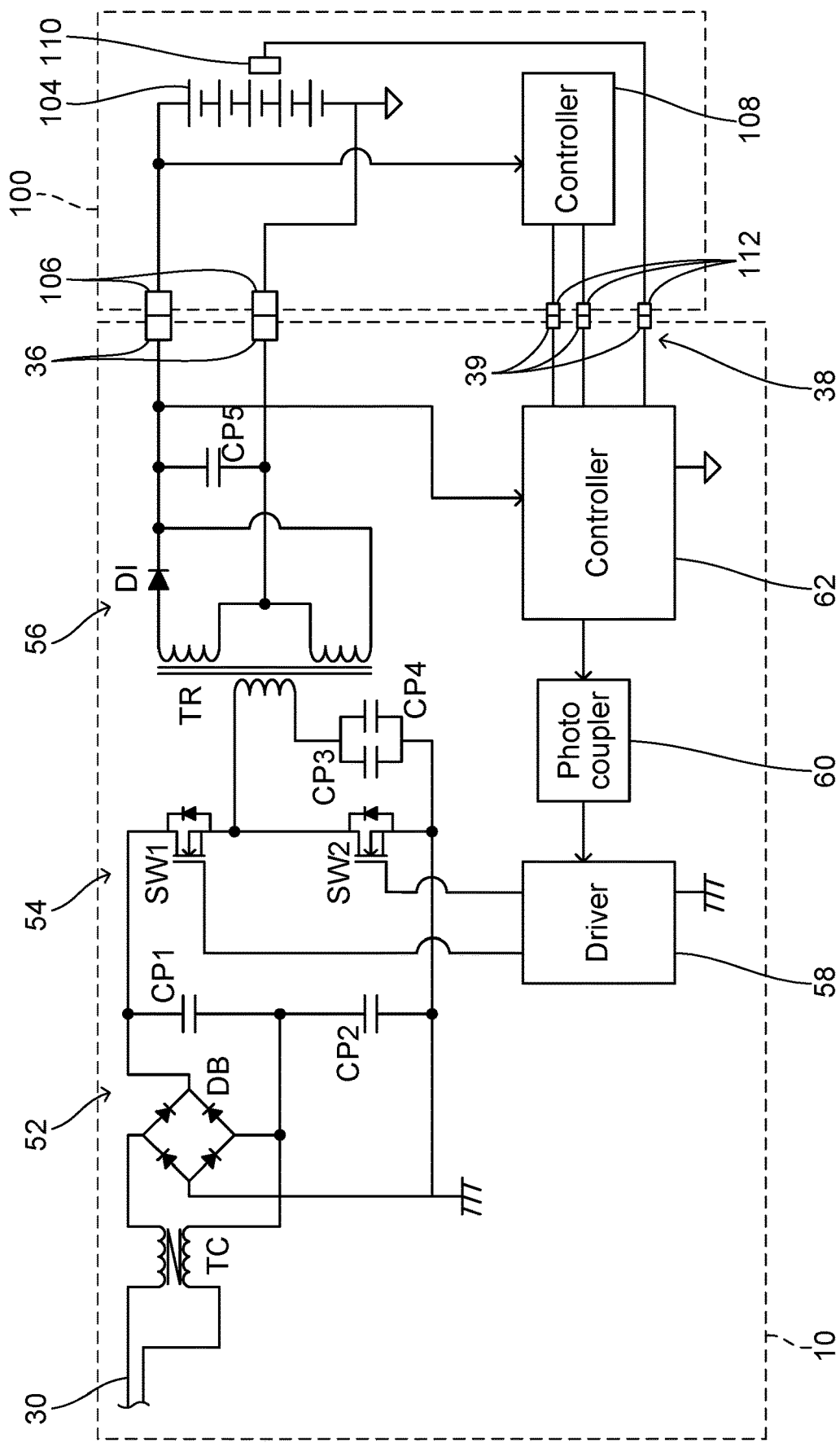
FIG. 8 is a circuit diagram of the charger 10 and a battery pack 100.

In the charger 10 of the present embodiment, as shown in FIG. 7, the blower 18 is disposed adjacent to the exhaust port 22. When as described above, the blower 18 is disposed closer to the exhaust port 22 than to the intake port 20, the flow of air within the housing 12 is less likely to be disturbed, and thus the interior of the housing 12 can be appropriately ventilated. In the charger 10, in addition to the blower 18 adjacent to the exhaust port 22, another blower adjacent to the intake port 20 may be further provided.

In the charger 10 of the present embodiment, the intake port 20 and the exhaust port 22 are respectively provided along the peripheral edges 12e and 12f of the bottom surface 12b in the housing 12. A length W20 over which the intake port 20 is provided along the peripheral edge 12e of the bottom surface 12b is longer than a length W22 over which the exhaust port 22 is provided along the peripheral edge 12f of the bottom surface 12b (see FIG. 7). In this configuration, even when areas of the intake holes 21 are individually small, an opening area of the intake port 20 as a whole can be increased. The length W20 over which the intake port 20 is provided is increased, and thus it is possible to reduce increases in temperatures of a large number of electronic components disposed over a wide area within the housing 12. By contrast, the length W22 over which the exhaust port 22 is provided may be substantially equal to the dimension of the blower 18 or may correspond thereto, and thus air from the blower 18 is efficiently exhausted from the exhaust port 22 and the charger 10 can also be downsized.

In the charger 10 of the present embodiment, when the housing 12 is mounted on the wall 2, the bottom surface 12b of the housing 12 is disposed along the wall 2, the intake port 20 is located along the lower edge 12e of the bottom surface 12b and the exhaust port 22 is located along the upper edge 12f of the bottom surface 12b. In this way, the intake port 20 is located lower than any of the electronic components of the charging circuit 16 which generate heat, and the exhaust port 22 is located higher than any of the electronic components of the charging circuit 16 which generate heat. In this configuration, the flow of air moving upward is formed in a substantially entire interior of the housing, and thus the interior of the housing is effectively ventilated. Since the intake port 20 and the exhaust port 22 are not completely covered with the wall, the flow of air in the intake port 20 and the exhaust port 22 is less likely to be inhibited by the wall 2.

In the charger 10 of the present embodiment, the bottom surface 12b of the housing 12 includes the curved portion curved away from the wall 2 along the lower edge 2e. At least part of the intake port 20 is provided in the curved portion along the lower edge 12e. Likewise, the bottom surface 12b of the housing 12 includes the curved portion curved away from the wall 2 along the upper edge 12f. At least part of the exhaust port 22 is provided in the curved portion along the upper edge 121. In this configuration, spaces are formed between the intake port 20 and the wall 2 and between the exhaust port 22 and the wall 2, and thus flow paths for air are acquired in vicinities of the intake port 20 and the exhaust port 22. Amounts of air flowing in the intake port 20 and the exhaust port 22 are increased, and thus ventilation within the housing 12 is more facilitated.

Figure 9A:
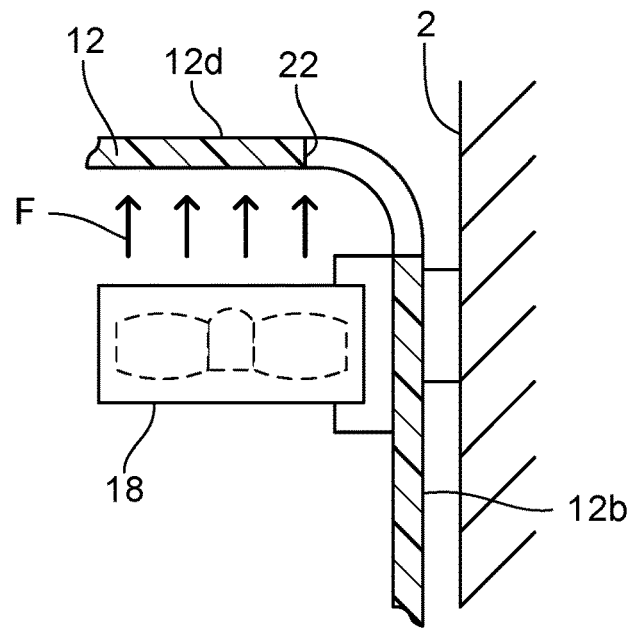
FIG. 9A shows an arrangement of a blower 18 in the embodiment.
Figure 9B:
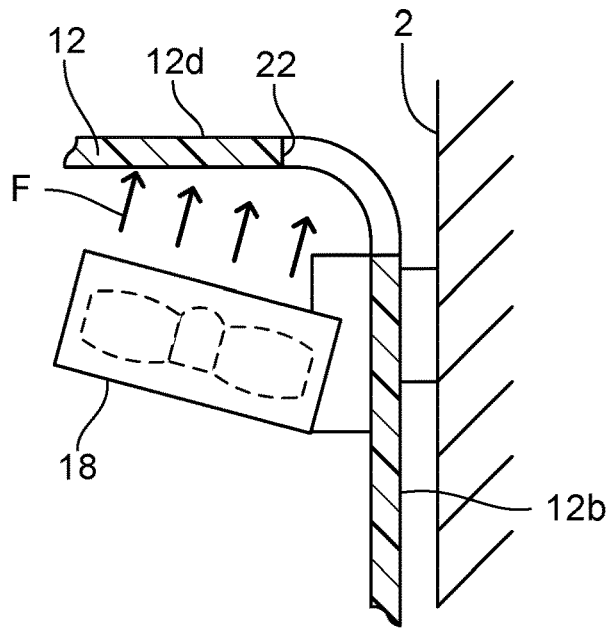
FIG. 9B shows an arrangement of a blower 18 which is inclined in another embodiment.

In the charger 10 of the present embodiment, as shown in FIG. 9A, the blower 18 is disposed so as to blow air toward the exhaust port 22. The direction F in which the blower 18 blows the air is substantially parallel to the bottom surface 12b of the housing 12, and also becomes parallel to the wall 2 when the housing 12 is mounted on the wall 2. However, in another embodiment, as shown in FIG. 9B, when housing 12 is mounted on the wall 2, the direction F in which the blower 18 blows the air may be angled with the wall 2. In this case, direction F in which the blower 18 blows the air is not parallel to the wall 2 but may be angled at less than 90 degrees with the wall 2. As described above, the blower 18 is inclined, and thus the amount of air exhausted in the exhaust port 22 is increased, with the result that the ventilation within the housing 12 can be more facilitated.

In the charger 10 of the present embodiment, as shown in FIG. 6, when the housing 12 is mounted on the wall 2, the sliding directions A and B of the battery pack 100 in the battery interface 14 are parallel to the vertical direction. In this configuration, the longitudinal direction of the battery interface 14 substantially coincides with the direction of the flow of the air within the housing 12, and thus the flow of the air within the housing 12 can be prevented from being inhibited by the batter interface 14 and components related thereto.

In the charger 10 of the present embodiment, as shown in FIG. 7, the charging circuit 16 includes the transformer TR. The blower 18 is disposed between the transformer TR and the exhaust port 22. Among the electronic components of the charging circuit 16, in particular, the transformer TR is an electronic component which generates a large amount of heat. The blower 18 is located between the transformer TR and the exhaust port 22, and thus it is possible to effectively exhaust, from the exhaust port 22, the heat generated by the transformer TR, and thereby effectively reduce an increase in the temperature of the charging circuit 16.

The charger 10 of the present embodiment includes a plurality of heat sink plates 46 as shown in FIG. 7. The heat sink plates 46 are disposed within the housing 12, and are made to stand on the circuit board 17 of the charging circuit 16. A pair of heat sink plates 46 opposed to each other via the transformer TR is included in the heat sink plates 46. Each of the pair of heat sink plates 46 is extended parallel to a direction extending from the intake port 20 toward the exhaust port 22. In this configuration, when the housing 12 is mounted on the wall 2, the pair of heat sink plates 46 is parallel to the vertical direction. A flow path 50 for air which is extended from the intake port 20 to the exhaust port 22 is formed so as to pass between the pair of heat sink plates 46, and thus the transformer TR disposed within the flow path 50 is effectively cooled. The first switching device SW1 and the second switching device SW2 of the charging circuit 16 are disposed on the heat sink plates 46. As described above, the first switching device SW1 and the second switching device SW2 are power semiconductor devices and are electronic components which generate a relatively large amount of heat. In addition to the first switching device SW1 and the second switching device SW2, an electronic component such as a power semiconductor device is disposed on the heat sink plates 46, and thus it is possible to reduce an increase in the temperature thereof.

Figure 10A:
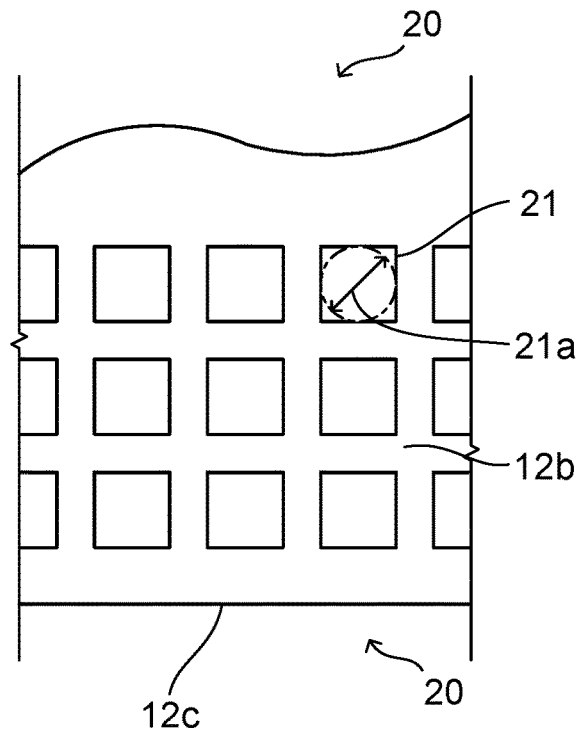
FIG. 10A shows a plurality of intake holes 21 in an intake port 20.
Figure 10B:
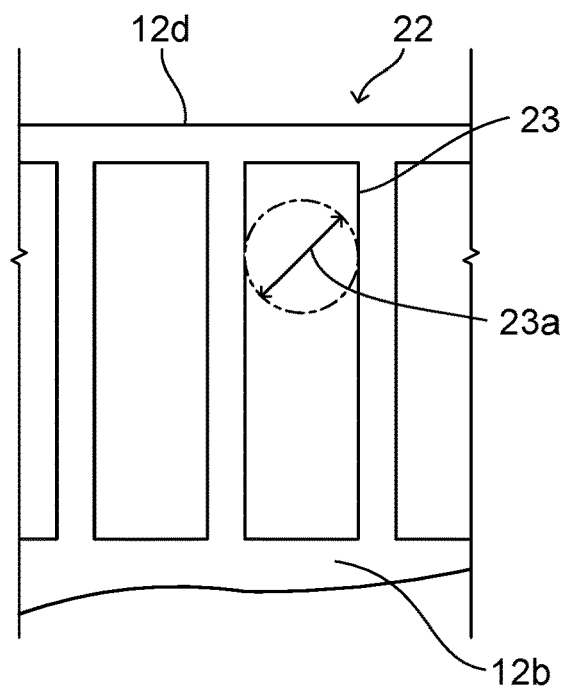
FIG. 10B shows a plurality of exhaust holes 23 in an exhaust port 22.

In the charger 10 of the present embodiment, as shown in FIGS. 10A and 10B, a shape of each of the intake holes 21 in the intake port 20 and a shape of each of the exhaust holes 23 in the exhaust port 22 differ from each other. In particular, an inscribed circle 21a of each of the intake holes 21 is smaller than an inscribed circle 23a of each of the exhaust holes 23. This is because of the following reasons. When the interior of the housing 12 is ventilated by the blower 18, dust intrudes from the intake port 20 into the housing 12. In order to reduce the intrusion of dust from the intake, port 20, the size of the intake holes 21 in the intake port 20 may be decreased. However, when the size of the intake holes 21 is excessively decreased, the amount of air flowing in the intake port 20 is lowered, and thus it is impossible to sufficiently ventilate the interior of the housing 12.

As a result of studying various shapes of the intake holes 21 in the above regard, it has been found that even when the areas of the intake holes 21 are the same, in the intake holes 21 in which the inscribed circle 21a is smaller, a smaller amount of dust is passed through the intake holes 21. This holds true for the exhaust holes 23 in the exhaust port 22. Specifically, even when areas of the exhaust holes 23 are the same, in the exhaust holes 23 in which the inscribed circle 23a is smaller, a smaller amount of dust is passed through the exhaust holes 23. The inscribed circles 21a of the intake holes 21 are designed to be smaller than the inscribed circles 23a of the exhaust holes 23 in the charger 10 of the present embodiment, based on the findings described above. In this configuration, the intrusion of dust from the intake port 20 into the housing 12 is reduced, and a larger amount of dust that has intruded into the housing 12 can be exhausted from the exhaust port 22. Consequently, the amount of dust left within the housing 12 is reduced, and thus, for example, the problem that dust accumulates on the charging circuit 16 is reduced.

In the charger 10 of the present embodiment, each of the areas of the intake holes 21 is smaller than any of the areas of the exhaust holes 23. In this configuration, the amount of dust intruding from the intake holes 21 into the housing 12 is reduced, and the amount of dust exhausted from the exhaust holes 23 to the outside of the housing 12 is increased. In this way, it is possible to reduce the amount of dust left within the housing. In addition to or instead, a number of intake holes 21 may be larger than a number of exhaust holes 23. In this configuration, even when the area of each of the intake holes 21 is small, the opening area of the intake port 20 as a whale can be increased. In this case, the intake holes 21 may be arranged in a matrix having a plurality of rows and columns. In this configuration, a large number of intake holes 21 can be formed in a compact range.

Figure 11:
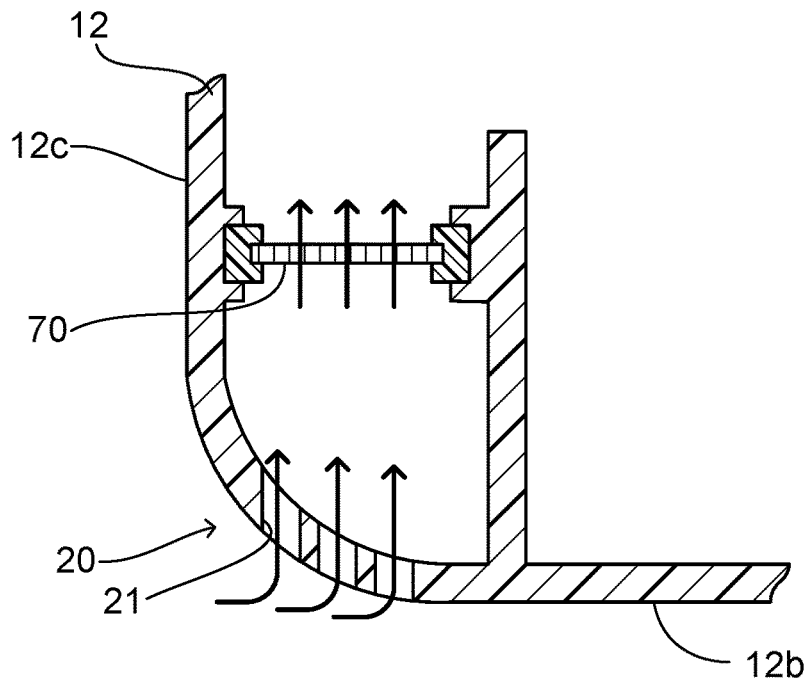
FIG. 11 is a diagram showing an embodiment in which a filter 70 is provided in the intake port 20.
Figure 12:
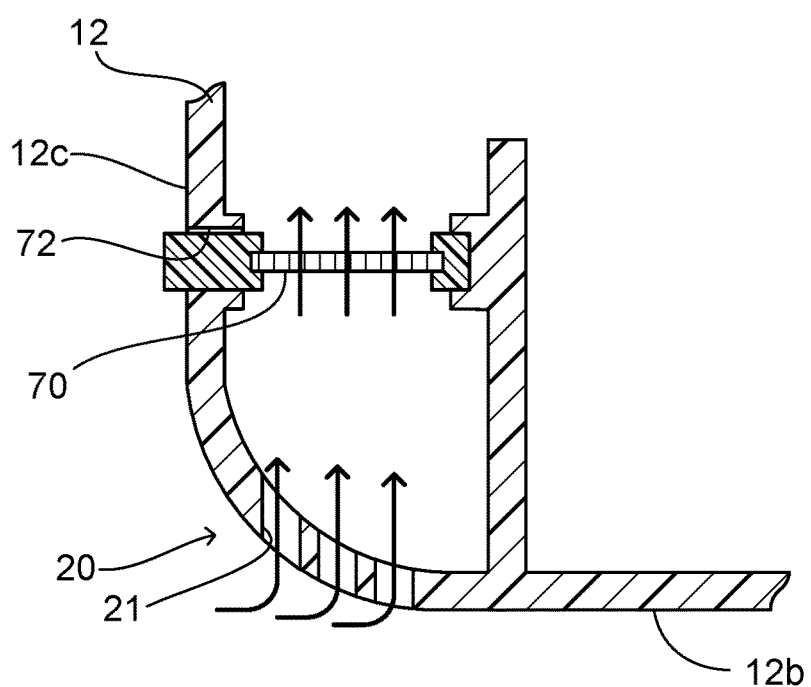
FIG. 12 is a diagram showing an embodiment in which an opening 72 for the filter 70 is provided in a housing.

As shown in FIG. 11, a filter 70 which collects dusts may be provided in the intake port 20 of the housing 12. Although the filter 70 is not particularly limited, the filter 70 may be, for example, a porous filter such as a paper filter, a woven fabric filter, a nonwoven fabric filter, metal filter or a sponge. In this way, even when the intake holes 21 are set relatively large, it is possible to prevent the intrusion of dust. In this case, the intake holes 21 may be set larger than the exhaust holes 23. As shown in FIG. 12, an opening 72 for attaching and detaching the filter 70 may be provided in the housing 12. In this configuration, it is possible to easily clean or replace the filter 70. Here, the filter 70 and structures (for example the opening 72) related thereto can be adopted similarly in various chargers regardless of whether or not the housing 12 can be mounted on the wall 2.

What is claimed is:

1. A charger configured to charge a battery pack of an electric power tool, comprising:
   a housing comprising an intake port and an exhaust port, the housing further comprising an upper surface and a bottom surface located opposite to the upper surface, each of the intake port and the exhaust port being located on a peripheral edge of the bottom surface;
   a battery interface disposed on the housing and configured to removably receive the battery pack;
   a charging circuit disposed within the housing and configured to supply charging power to the battery pack attached to the battery interface; and a blower configured to introduce air into the housing through the intake port and exhaust air from the housing through the exhaust port, wherein at least one wall mounting portion is provided on the bottom surface of the housing such that the housing is configured to be mountable on a wall extending in a vertical direction in a predetermined orientation, and when the housing is mounted on the wall in the predetermined orientation, the bottom surface is disposed along the wall, the peripheral edge of the bottom surface includes a lower side portion and an upper side portion located opposite to the lower side portion in the vertical direction, the intake port is located on the lower side onion of the peripheral edge of the bottom surface and the exhaust port is located on the upper side portion of the peripheral edge of the bottom surface, the exhaust port is located higher in the vertical direction than the intake port when the housing is mounted on the wall in the predetermined orientation, and the bottom surface of the housing includes a curved portion on the lower side portion of the peripheral edge, the curved portion is curved away from the wall, and the intake port is at least partly disposed within the curved portion on the lower side portion of the peripheral edge.

2. The charger according to claim 1, wherein the housing further comprises a front surface and a back surface each extending between the upper surface and the bottom surface, when the housing is mounted on the wall in the predetermined orientation, the front surface and the back surface become opposite to each other in the vertical direction such that the back surface is located higher in the vertical direction than the front surface, the lower side portion of the peripheral edge of the bottom surface is located in a boundary between the front surface and the bottom surface, and the upper side portion of the peripheral edge of the bottom surface is located in a boundary between the back surface and the bottom surface.

3. The charger according to claim 2, wherein the bottom surface of the housing further includes a second curved portion on the upper side portion of the peripheral edge, the second curved portion is curved away from the wall, and the exhaust port is at least partly disposed within the second curved portion on the upper side portion of the peripheral edge.

4. The charger according to claim 1, wherein a distance from the blower to the exhaust port is shorter than a distance from the blower to the intake port.

5. The charger according to claim 4, wherein the blower is disposed adjacent to the exhaust port.

6. The charger according to claim 1, wherein the blower is disposed so as to blow air toward the exhaust port along a blowing direction, and the blowing direction is angled with the wall when the housing is mounted on the wall.

7. The charger according to claim 1, wherein the battery interface is disposed on the upper surface of the housing.

8. The charger according to claim 1, wherein the battery interface is configured to receive the battery pack slidably in a sliding direction, and the sliding direction becomes parallel to the vertical direction when the housing is mounted on the wall.

9. The charger according to claim 1, further comprising a filter disposed on the intake port.

10. The charger according to claim 9, wherein the housing further comprises an opening for attaching and detaching the filter.

11. The charger according to claim 1, wherein the charging circuit comprises a transformer, and the blower is located between the transformer and the exhaust port.

12. The charger according to claim 11, further comprising a pair of heat sink plates opposed to each other via the transformer, and each of the pair of heat sink plates becomes parallel to the vertical direction when the housing is mounted on the wall.

13. The charger according to claim 12, wherein the charging circuit comprises a power semiconductor device disposed on the pair of the heat sink plates.

14. The charger according to claim 1, wherein the intake port and the exhaust port each comprises a plurality of holes defined on the housing.

15. A charger configured to charge a battery pack of an electric power tool, comprising:

a housing comprising an intake port and an exhaust port, the housing further comprising an upper surface and a bottom surface located opposite to the upper surface, each of the intake port and the exhaust port being located on a peripheral edge of the bottom surface;

a battery interface disposed on the housing and configured to removably receive the battery pack;

a charging circuit disposed within the housing, the charging circuit comprising a transformer and being configured to supply charging power via the transformer to the battery pack attached to the battery interface; and a blower configured to introduce air into the housing through the intake port and exhaust air from the housing through the exhaust port, wherein at least one wall mounting portion is provided on the bottom surface of the housing such that the housing is configured to be mountable on a wall extending in a vertical direction in a predetermined orientation, when the housing is mounted on the wall in the predetermined orientation, the bottom surface is disposed along the wall and the exhaust port is located higher in the vertical direction than the intake port, and in a view perpendicular to the bottom surface of the housing, the blower is located between the transformer and the exhaust port and a distance from the transformer to the exhaust port is shorter than a distance from the transformer to the intake port.

16. The charger according to claim 15, further comprising a pair of heat sink plates opposed to each other via the transformer, and each of the pair of heat sink plates becomes parallel to the vertical direction when the housing is mounted on the wall in the predetermined orientation.

17. The charger according to claim 16, wherein the charging circuit comprises a power semiconductor device disposed on the pair of the heat sink plates.

18. The charger according to claim 15, further comprising a second blower disposed within the housing and configured to supply cooling air to the battery pack attached to the battery interface.

* * * * *